Dec. 8, 1953   D. O. WENDT   2,661,865
APPARATUS FOR TREATING ANIMALS
Filed May 19, 1950
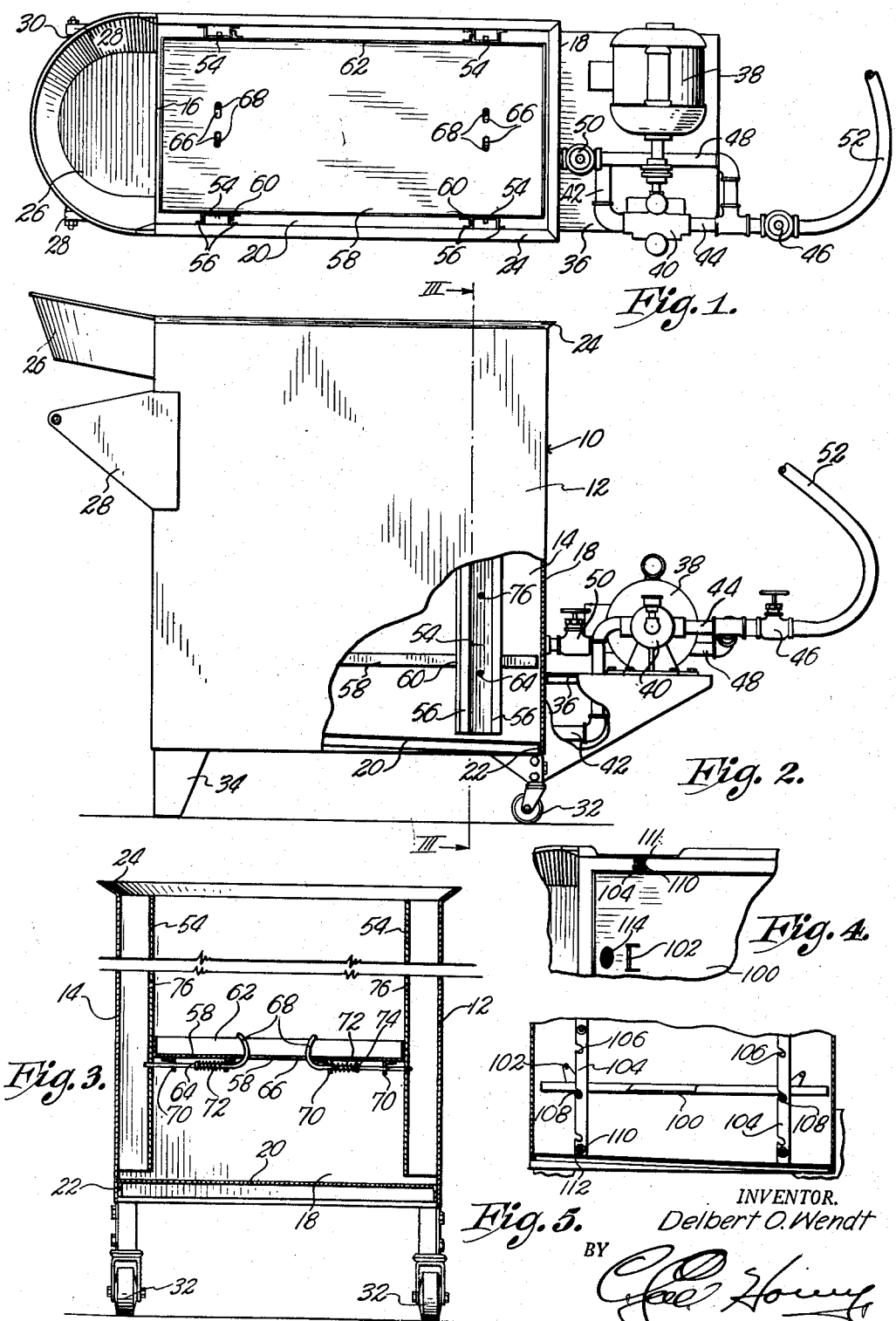
INVENTOR.
Delbert O. Wendt
BY
ATTORNEY Patented Dec. 8, 1953

2,661,865

UNITED STATES PATENT OFFICE 2,661,865

APPPARATUS FOR TREATING ANIMALS

Delbert O. Wendt, Bonner Springs, Kans.

Application May 19, 1950, Serial No. 162,936

1 Claim. (Cl. 220—93)

This invention relates to veterinary supplies and particularly to tanks adaptable for use and assistance in the treatment of small animals either in the form of a bath or "dip," the primary object being to provide a circulating system for permitting spraying of the treating liquid upon the animal and to further provide a shelf or platform within the tank upon which the animal stands during the treatment, which shelf is readily adjustable to differing heights within the tank.

It is the most important object of the present invention to provide an animal treating tank having a platform therein that is vertically reciprocable to accommodate animals of differing heights, there being a plurality of guide tracks in the tank for the platform, and means on the platform and the tracks for releasably holding the former in a selected position.

Another important object of the present invention is to provide a shelf or platform for tanks having a number of spring-loaded plungers adapted to enter corresponding perforations formed in upright guides or tracks on the innermost faces of the side walls of the tank.

Other objects of the present invention include the way in which the platform itself is provided with guides for sliding along the supporting uprights therefor; the way in which the entire assembly is rendered portable; the manner of mounting a recirculating pump and motor assembly on the tank for movement therewith; and the way in which the uppermost open end of the tank is formed to redirect sprayed liquid into the tank during use.

In the drawing:

Figure 1 is a top plan view of apparatus for treating animals made in accordance with my present invention.

Fig. 2 is a side elevational view thereof, parts being broken away and in section to reveal details of construction.

Fig. 3 is a vertical, cross-sectional view taken on line III—III of Fig. 2 looking in the direction of the arrows.

Fig. 4 is a partial top plan view illustrating a modification of Fig. 1, parts being broken away to reveal details of construction; and Fig. 5 is a partial vertical, cross-sectional view illustrating a modification of Fig. 3, parts being broken away to reveal details of construction.

It is common knowledge that veterinarians and even individuals who own pets are in need of a relatively simple, inexpensive tank-like means for aiding in the bathing and treating of such pets and animals. As will hereinafter appear, the assembly hereof is usable either as a spray or shower, or as a dip and when the same is placed in use, the liquid will be confined within a relatively small area adjacent the animal being treated, thereby speeding up the entire operation and eliminating the messy, troublesome task usually accompanying the procedure.

There is illustrated in the drawing an open top tank, broadly designated by the numeral 10, having a pair of opposed vertical side walls 12 and 14, a pair of end walls 16 and 18, and a bottom wall 20. Bottom wall 20 is, as illustrated in Fig. 2 of the drawing, inclined downwardly toward the end wall 18 and entirely confined within the four walls 12, 14, 16 and 18. A continuous downturned flange 22, bearing against the last mentioned walls and secured thereto, serves as a means for presenting a liquid-tight joint for bottom wall 20. The uppermost edges of walls 12, 14 and 18 are provided with an out-turned, flared flange or lip portion 24 and the uppermost edge of end wall 16 has a semi-circular, inwardly inclined trough or apron 26 secured thereto. A pair of opposed brackets 28, mounted on tank 10 immediately below apron 26, mounts an interconnected handle 30.

Tank 10 is supported by a pair of wheels or casters 32 adjacent end wall 18 and by a pair of feet, one only of which is illustrated in Fig. 2 and designated by the numeral 34.

A shelf 36 supported by and extending outwardly from wall 18 supports an electric motor or other prime mover 38 operably coupled with a liquid pump 40 also mounted on shelf 36. Pump 40 couples at the inlet end with tank 10 adjacent bottom 20 by means of a pipe 42. An outlet pipe 44 for pump 40 has a shut-off valve 46 therein and a branch 48 between pump 40 and valve 46. Branch 48 is provided with a shut-off valve 50 and registers with the tank 10 through wall 18 thereof in spaced relationship above the pipe 42. Outlet pipe 44 is adapted to receive a hose 52 of sufficient length to extend above the open top of tank 10 and if desired, the outlet end of the hose 52 may be provided with a suitable spray nozzle (not shown).

Each of the side walls 12 and 14 has a pair of elongated, tubular supports 54 of identical character secured directly to the innermost faces thereof. Members 54 are all in parallelism and are U-shaped in cross-section as shown in Fig. 1, there being a pair of out-turned flanges 56 on each tubular member 54 for securing the same to the tank 10. A shelf or platform 58 having an area slightly less than the area of bottom 20 is disposed in tank 10 between the two pairs of supporting members 54 and is held in a guided position with respect to the members 54 by two pairs of opposed brackets 60 on opposite edges of the platform 58.

It is noted that platform 58 is tray-like through utilization of an up-turned continuous flange 62 and it is upon this flange 62 that the brackets 60 are rigidly secured. The platform 58 is provided with two pairs of substantially L-shaped plungers 64, one leg whereof extends upwardly through an elongated opening 66 in the platform 58 and in the form of a hook or finger grip 68. Each plunger 64 is guided in its reciprocable movement transversely of the longitudinal axis of platform 58 and therebelow, by a pair of spaced, perforated, brackets 70, depending from platform 58.

A spring 72 coiled about each plunger 64, bears at one end thereof against the innermost bracket 70 and against a shoulder 74 on plunger 64 for holding the latter at the outermost end of its path of travel. The plungers 64 are adapted for selective extension into any one of a number of openings 76 in corresponding upright, supporting members 54.

It is seen that an operator may shift the position of platform 58 with respect to bottom wall 20 by merely moving the finger pieces 68 of each pair of plungers 64 toward each other against the action of springs 72, thereby retracting plungers 64 from openings 76. He may thereupon utilize the same finger pieces 68 for raising and lowering the platform 58 to the desired height. During such movement of the platform 58, the latter is guided against lateral movement toward and away from the walls 12 and 14 by the members 54 and is also guided against movement toward or away from the end walls 16 and 18 by the plurality of brackets 60. Accordingly, the operator is assured of easy alignment of the plungers 64 in the openings 76.

When the dipping tank 10 is placed in use, the animal is placed upon the platform 58 after locating the same at a proper height to dispose the animal's head in overlying relationship to the trough 26. Motor 38 is thereupon energized and valve 46 is opened to direct the treating fluid within tank 10 through hose 52 for spraying upon the animal on platform 58. Many of the medicants and other solutions that are commonly employed in such treatments, need constant circulation or agitation to prevent settling of certain of the component parts thereof and accordingly through use of such circulating system, a proper mixture is maintained. Additionally, the settlings will have a tendency to be directed to the outlet pipe 42 by virtue of the inclined disposition of bottom wall 20. In the event that additional agitation or circulation is desired over and above that provided for by passage of the fluid through hose 52, valve 50 may be opened and pump 40 operating at full capacity, will redirect certain of the liquid back into tank 10 by way of branch 48. By the same token, if it is desired to utilize the tank 10 as a dip, platform 58 may be entirely removed or lowered to a position resting upon or adjacent to bottom 20, in which event, valve 46 may be closed and the liquid circulated through branch 48 and open valve 50. It is noted that the flared portion 24, as well as the inclined semi-circular trough 26, will catch such liquid as has a tendency to be directed away from tank 10 and drain the same back toward the bottom wall 20. The entire assembly, including motor 38 and pump 40, may be moved to any desired position by merely grasping the handle 30 and elevating the feet 34 to a point where the tank 10 can be rolled on wheels 32.

In the form of my invention illustrated in Figs. 4 and 5 of the drawing, a platform 100 is provided with a pair of opposed, upstanding handles 102 to facilitate vertical reciprocation thereof. The platform 100 is supported by two pairs of opposed, up-standing guides, all of identical character and each designated by the numeral 104. Guides 104 are in turn provided with a number of spaced notches 106 for selectively receiving a corresponding lateral pin 108 on the platform 100. In other words, there are four standards or supports 104 and a like number of pins 108. Pins 108 are each provided with a head 110 on the outermost free end thereof and the supports 104 are held in spaced relationship to the corresponding side wall upon which the same are mounted by spacers 111.

A bolt or the like 112 passing through each spacer 111 respectively, secures the supports 104 to the side walls of the tank. Platform 100 has a drain opening therein that is covered by a screen 114. It is notable that the length of platform 100 is less than the length of the tank so that when the former is moved to differing heights, it can be shifted forwardly and upwardly with respect to notches 106 and thereby release the same from the supports 104. In all other respects the modification of Figs. 4 and 5 is like that previously described and illustrated in Figs. 1 to 3 inclusive.

The simplicity, ease of operation and cheapness of construction are all important features worthy of notation and those skilled in the field, will appreciate the many advantages emanating from the use thereof. Accordingly, such changes and modifications as fairly come within the spirit of this invention as defined by the scope of the appended claim, are contemplated hereby.

Having thus described the invention, what is claimed as new and desired to be secured by Letters Patent is:

In combination with an open top tank having a pair of spaced, vertical side walls, a pair of spaced, vertical supports mounted on the innermost face of each side wall respectively, each support having a vertical row of openings therein; an elongated, horizontal platform disposed within the tank for vertical sliding engagement of its longitudinal edges with the supports; a separate plunger on the lowermost face of the platform for each support respectively, each plunger having a finger hook thereon, said platform having a transverse slot receiving each of the hooks respectively, there being two pairs of plungers, the plungers of each pair thereof being reciprocable transversely of the platform toward and away from each other, each plunger being normally within an opening of a corresponding support, and each having a spring coiled thereabout for yieldably holding the same biased into the openings; and a pair of brackets on each longitudinal edge respectively of the platform, each pair of brackets being between a pair of supports in sliding relationship thereto for holding the platform against movement relative to the tank on the longitudinal axis of the platform.

DELBERT O. WENDT.

References Cited in the file of this patent

UNITED STATES PATENTS

| Number | Name | Date |
|---|---|---|
| 131,789 | Schramm | Oct. 1, 1872 |
| 863,649 | Robinson | Aug. 20, 1907 |
| 987,752 | Short et al. | Mar. 28, 1911 |
| 1,206,702 | Hawes | Nov. 28, 1916 |
| 1,253,456 | Albert | Jan. 15, 1918 |
| 1,508,548 | Gottheimer | Sept. 16, 1924 |
| 1,739,339 | Willauer | Dec. 10, 1929 |
| 2,369,335 | Burman | Feb. 13, 1945 |